US012535323B2

(12) United States Patent
Saini et al.

(10) Patent No.: US 12,535,323 B2
(45) Date of Patent: Jan. 27, 2026

(54) UPDATING VEHICLE ATTITUDE FOR EXTENDED DEAD RECKONING ACCURACY

(71) Applicant: QUALCOMM Incorporated, San Diego, CA (US)

(72) Inventors: Vinod Kumar Saini, Bengaluru (IN); Abdelmonaem Lakhzouri, Fremont, CA (US); Bo Zheng, Sunnyvale, CA (US); William Morrison, San Francisco, CA (US)

(*) Notice: Subject to any disclaimer, the term of this patent is extended or adjusted under 35 U.S.C. 154(b) by 304 days.

(21) Appl. No.: 17/397,783

(22) Filed: Aug. 9, 2021

(65) Prior Publication Data

US 2022/0042802 A1    Feb. 10, 2022

Related U.S. Application Data

(60) Provisional application No. 63/063,834, filed on Aug. 10, 2020.

(51) Int. Cl.
*B60W 40/112* (2012.01)
*B60W 40/114* (2012.01)
(Continued)

(52) U.S. Cl.
CPC ........... *G01C 21/18* (2013.01); *G01C 21/188* (2020.08); *G01S 19/37* (2013.01); *G01S 19/40* (2013.01); *G01S 19/43* (2013.01); *G01S 19/50* (2013.01)

(58) Field of Classification Search
CPC ...... G01C 21/18; G01C 21/188; G01C 21/16; G01S 19/37; G01S 19/40; G01S 19/43;
(Continued)

(56) References Cited

U.S. PATENT DOCUMENTS 10,783,784 B1 * 9/2020 Drayna ................. G07C 5/085
2015/0185002 A1 * 7/2015 Yang ..................... G01C 22/006
702/151
(Continued)

FOREIGN PATENT DOCUMENTS

JP          2010043945 A   *  2/2010
KR       101160630 B1   *  6/2012     ............. G01D 21/00
(Continued)

OTHER PUBLICATIONS

Yoo_KR_101160630_B1_2012_translated_description (Year: 2012).*
(Continued)

*Primary Examiner* — Jelani A Smith
*Assistant Examiner* — George A Alcorn, III (57) ABSTRACT

Techniques for vehicular navigation include determining a first attitude of a vehicle with respect to a reference frame at a first epoch, the determined first attitude including a determined first roll angle; computing an attitude of the INS at a second epoch that is subsequent to the first epoch; determining a second attitude of the vehicle at the second epoch; updating the determined second attitude of the vehicle, based on a determination that an absolute change in a yaw angle of the vehicle between the first epoch and the second epoch is less than a predetermined threshold, by setting a roll angle of the determined second attitude of the vehicle to equal the determined first roll angle; and based on the updated second attitude of the vehicle, determining an updated attitude of the INS. Applications relating to road vehicular (e.g., automobile) use are described.

21 Claims, 7 Drawing Sheets

(51) Int. Cl.
   *G01C 21/16* (2006.01)
   *G01C 21/18* (2006.01)
   *G01S 19/37* (2010.01)
   *G01S 19/40* (2010.01)
   *G01S 19/43* (2010.01)
   *G01S 19/49* (2010.01)
   *G01S 19/50* (2010.01)

(58) Field of Classification Search
   CPC ...... G01S 19/50; G01S 19/49; B60W 40/112; B60W 40/114
   USPC .......................................................... 701/500
   See application file for complete search history.

(56) References Cited

U.S. PATENT DOCUMENTS

2017/0227374 A1* 8/2017 Theytaz ................ G01C 22/006
2018/0292212 A1* 10/2018 Bobye ................ G01C 25/005
2020/0326189 A1* 10/2020 Villien .................... G01S 19/47
2021/0123754 A1* 4/2021 Mordechai ............ H04W 4/026
2021/0371030 A1* 12/2021 Begleiter ................ B62J 27/00

FOREIGN PATENT DOCUMENTS

TW        201243282 A     11/2012
TW        201501979 A     1/2015

OTHER PUBLICATIONS

International Search Report and Written Opinion—PCT/US2021/045364—ISA/EPO—Nov. 29, 2021.
Taiwan Search Report—TW110129522—TIPO—Jan. 15, 2025.

* cited by examiner

UPDATING VEHICLE ATTITUDE FOR EXTENDED DEAD RECKONING ACCURACY

RELATED APPLICATIONS

This application claims the benefit of U.S. Provisional Application No. 63/063,834, filed Aug. 10, 2020, entitled "SYSTEMS, METHODS, AND APPARATUS FOR EXTENDED DEAD RECKONING ACCURACY", which is assigned to the assignee hereof, and incorporated herein by reference in its entirety.

FIELD OF DISCLOSURE

Aspects of the disclosure relate to navigation, including vehicular navigation.

BACKGROUND

An inertial navigation system (INS) may be used to track the position, velocity, and/or orientation of an object relative to a starting point, velocity, and/or orientation. An INS may be used in conjunction with a global navigation satellite system (GNSS) receiver and may be used for dead reckoning when a GNSS signal is not available.

BRIEF SUMMARY

An example method of vehicular navigation, according to this disclosure, may comprise determining a first attitude of a vehicle with respect to a reference frame at a first epoch. The method also may comprise based on measurement data from an inertial navigation system (INS) of the vehicle, determining an attitude of the INS at a second epoch that is subsequent to the first epoch. The method also may comprise based on the determined attitude of the INS, determining a second attitude of the vehicle at the second epoch. The method also may comprise applying a constraint to the determined second attitude of the vehicle to produce an updated second attitude of the vehicle, wherein applying the constraint limits a change in one or more aspects of the determined second attitude of the vehicle from the first epoch to the second epoch. The method also may comprise based on the updated second attitude of the vehicle, determining an updated attitude of the INS.

An example device for vehicular navigation, according to this disclosure, may comprise an inertial navigation system (INS), a memory, one or more processors communicatively coupled with the INS and the memory, wherein the one or more processors are configured to determine a first attitude of a vehicle with respect to a reference frame at a first epoch. The one or more processors further may be configured to, based on measurement data from an inertial navigation system (INS) of the vehicle, determine an attitude of the INS at a second epoch that is subsequent to the first epoch. The one or more processors further may be configured to, based on the determined attitude of the INS, determine a second attitude of the vehicle at the second epoch. The one or more processors further may be configured to apply a constraint to the determined second attitude of the vehicle to produce an updated second attitude of the vehicle, wherein applying the constraint limits a change in one or more aspects of the determined second attitude of the vehicle from the first epoch to the second epoch. The one or more processors further may be configured to, based on the updated second attitude of the vehicle, determine an updated attitude of the INS.

An example apparatus for vehicular navigation, according to this disclosure, may comprise means for determining a first attitude of a vehicle with respect to a reference frame at a first epoch. The apparatus further may comprise means for determining an attitude of an inertial navigation system (INS) of the vehicle at a second epoch that is subsequent to the first epoch, based on measurement data from the INS. The apparatus further may comprise means for determining a second attitude of the vehicle at the second epoch based on the determined attitude of the INS. The apparatus further may comprise means for applying a constraint to the determined second attitude of the vehicle to produce an updated second attitude of the vehicle, wherein applying the constraint limits a change in one or more aspects of the determined second attitude of the vehicle from the first epoch to the second epoch. The apparatus further may comprise means for determining an updated attitude of the INS based on the updated second attitude of the vehicle.

According to this disclosure, an example non-transitory computer-readable medium stores instructions for vehicular navigation, the instructions comprising code for determining a first attitude of a vehicle with respect to a reference frame at a first epoch. The instructions further may comprise code for determining an attitude of an inertial navigation system (INS) of the vehicle at a second epoch that is subsequent to the first epoch based on measurement data from the INS. The instructions further may comprise code for determining a second attitude of the vehicle at the second epoch based on the determined attitude of the INS. The instructions further may comprise code for applying a constraint to the determined second attitude of the vehicle to produce an updated second attitude of the vehicle, wherein applying the constraint limits a change in one or more aspects of the determined second attitude of the vehicle from the first epoch to the second epoch. The instructions further may comprise code for determining an updated attitude of the INS based on the updated second attitude of the vehicle.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Aspects of the disclosure are illustrated by way of example. In the accompanying figures, like reference numbers indicate similar elements.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the appended claims.

As described herein, a satellite receiver, such as a Global Navigation Satellite Systems (GNSS) receiver, may be integrated into a mobile device comprising an electronic device or system. Such a mobile device can include, for example, consumer, industrial, and/or commercial electronics, vehicles, assets, vessels, and the like. As described herein, a location estimate of the satellite receiver or mobile device into which the satellite receiver is integrated may be referred to as a location, location estimate, location fix, fix, position, position estimate, or position fix of the satellite receiver or mobile device. Moreover, the location estimate may be geodetic, thus providing location coordinates for the mobile device (e.g., latitude and longitude) which may or may not include an altitude component (e.g., height above sea level, height above or depth below ground level, floor level, or basement level). In some embodiments, a location of the satellite receiver and/or mobile device comprising the satellite receiver may also be expressed as an area or volume (defined either geodetically or in civic form) within which the satellite receiver is expected to be located with some probability or confidence level (e.g., 67%, 95%, etc.). In the description contained herein, the use of the term location may comprise any of these variants unless indicated otherwise. When computing the location of a satellite receiver, such computations may solve for local X, Y, and possibly Z coordinates and then, if needed, convert the coordinates from one coordinate frame to another.

Figure 1:
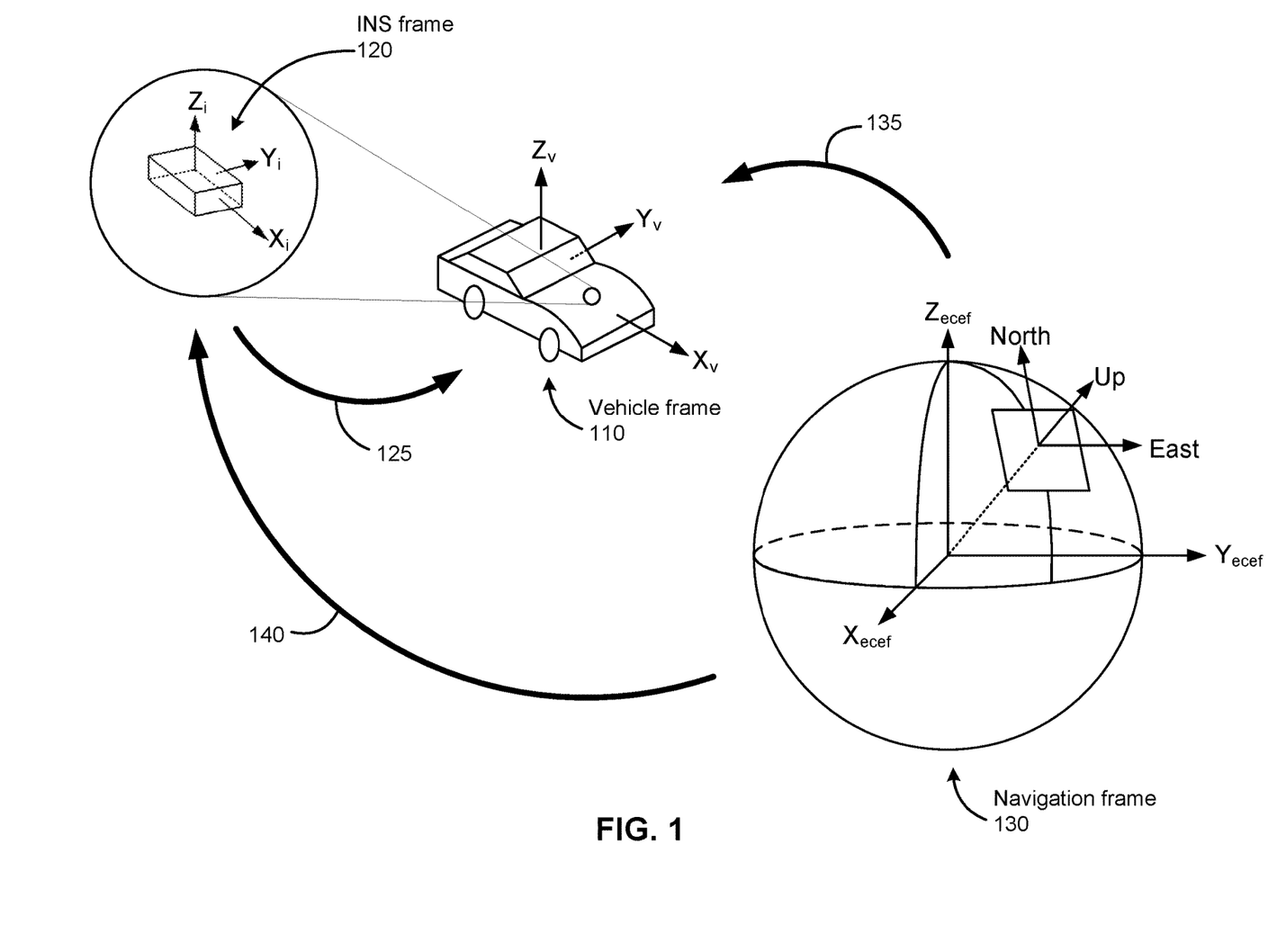
FIG. 1 shows an example of relations among an INS body frame, a vehicle body frame, and a reference (navigation) frame.

An inertial navigation system (INS) is a relative positioning system that is used to track the position, velocity, and/or orientation of an object relative to a starting point, velocity, and/or orientation. Specifically, an INS indicates movement relative to a body frame (also called a "body coordinate system"), typically by providing a rate of angular movement and an acceleration with reference to axes of the body frame. Such indications of relative movement may be used for vehicular navigation (e.g., location estimation, driving assistance, and/or automation) by dead reckoning (DR). As shown in FIG. 1, the orientation of the vehicle frame 110 (the body frame of a vehicle in which the INS is located) relative to the INS frame 120 (the body frame of the INS) may be expressed as a rotation matrix $R_{INS}^{veh}$ (also called a Direction Cosine Matrix or DCM) from the INS frame 120 to the vehicle frame 110, illustrated by arrow 125. This orientation is constant for a case in which the INS is fastened immovably to the vehicle or is otherwise held in a fixed position relative to the vehicle. The origin of the vehicle frame 110 may be determined to coincide with a center of gravity of the vehicle.

Changes in position, velocity, and/or orientation of an INS are based on measurements provided by an inertial measurement unit (IMU) of the INS. An IMU is typically implemented to include a gyroscope that measures a rate of rotation about at least one axis (typically, a rate of rotation about each of three orthogonal axes of a body frame of the IMU). Such a gyroscope may be, for example, a micro-electro-mechanical systems (MEMS) gyroscope. A MEMS gyroscope may be, by way of example and not limitation, a vibrating mass gyroscope, a vibrating structure gyroscope, a tuning fork gyroscope, a vibrating ring gyroscope, a piezoelectric plate gyroscope, or any combination thereof.

An IMU may also include an accelerometer that measures a rate of acceleration along at least one axis (typically, a rate of acceleration along each of three orthogonal axes of a body frame of the IMU). Such an accelerometer may be, for example, a MEMS accelerometer. A MEMS accelerometer may be constructed of, by way of example and not limitation, capacitive, variable capacitive, inductive, piezoelectric, or piezoresistive components, or any combination thereof.

The IMU measurements are affected by white noise and biases, which may vary with time and temperature. The biases are estimated (e.g., using Kalman filtering), and the estimated biases are removed (e.g., subtracted) from the IMU measurements to obtain corrected measurements of angular rate and acceleration. These corrected measurements may be used to mechanize position, velocity, and device attitude by, for example, updating or "propagating" a position state, a velocity state, and an attitude state at each measurement/estimation period, known as an epoch. Epochs may repeat periodically at a rate of underlying measurements on which position estimation is based and/or at a rate at which the Kalman filter or other estimation engine is operating. According to some embodiments, this may occur periodically every second. Depending on desired functionality and/or other factors, epochs in other embodiments may have a longer or shorter periodicity.

Bias-corrected IMU measurements may still be contaminated by error due to, for example, integration, quantization errors, bias estimation error, and/or noise modeling. To some extent, measurement error may be limited by applying non-holonomic constraints: for example, that a vehicle in motion must be within the boundaries of a road surface; that it must be moving forward and not backward; that its position cannot slip suddenly to the side, or up or down. In general, however, measurements from a global navigation satellite system (GNSS) receiver may be used to correct sensor bias to a degree sufficient to support continued navigation by DR.

A GNSS is an absolute positioning system that is used to indicate a position of a GNSS receiver in space. Examples of GNSSs include the Global Positioning System (GPS) of the United States, the Global Navigation Satellite System (GLONASS) of Russia, the Galileo system of the European Union, and the BeiDou system of China. As shown in FIG. 1, the navigation frame 130 that is used to indicate a position of a GNSS receiver is a world reference frame which may be, for example, an earth-centered earth-fixed (ECEF) coordinate frame, an east-north-up (ENU) coordinate frame, or an north-east-down (NED) coordinate frame.

GNSS measurements may be used to correct INS-based attitude and PVT (position, velocity, and time) estimation by sensor fusion. For example, GNSS measurements may be used to correct INS-based attitude, position, and velocity states. However, when GNSS signals are degraded (e.g., by multipath) or otherwise unavailable (e.g., due to unobservability of the satellites, such as when the vehicle is in a tunnel), uncorrected INS error accumulates and causes the attitude to drift with time. Such error in attitude may cause poor DR performance (e.g., errors in position, velocity, and/or heading). As one consequence of a drift in attitude, for example, the gravity component (as measured by an accelerometer of the IMU) may begin to leak into other axes, causing contamination of the velocity and/or position estimates.

Embodiments address these and other issues by helping mitigate attitude drift by applying a constraint to modify roll, pitch, and/or yaw angles of a computed vehicle attitude, based on known road conditions and/or other information. It may be desired to obtain improved DR performance during periods of GNSS degradation and/or unavailability.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims.

Although the particular examples discussed herein relate primarily to passenger vehicles, it will be understood that the principles, methods, and apparatuses disclosed relate more generally to powered road vehicles, including cargo vehicles (e.g., trucks, tractor-trailers), motorcycles, and public transport vehicles (e.g., buses), and also to other ground vehicles (including, for example, farm vehicles), and that uses of these principles in such contexts is specifically contemplated and hereby disclosed.

Figure 2A:
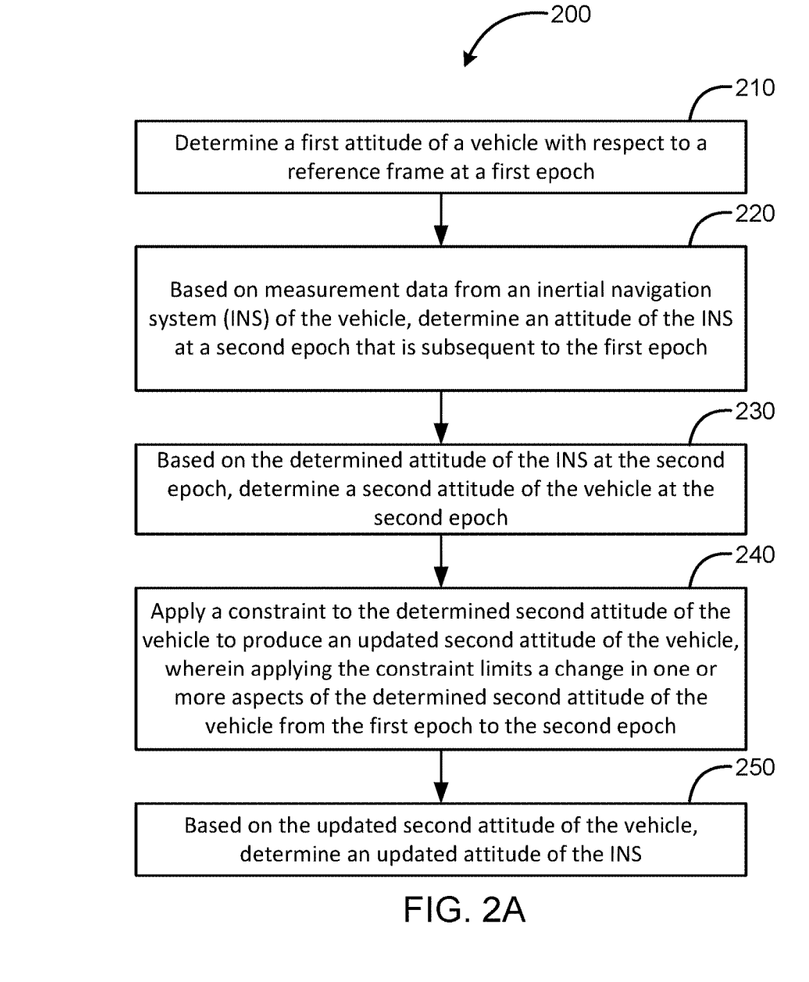
FIG. 2A shows a flow chart of a method 200 for vehicular navigation according to a general configuration.
Figure 6:
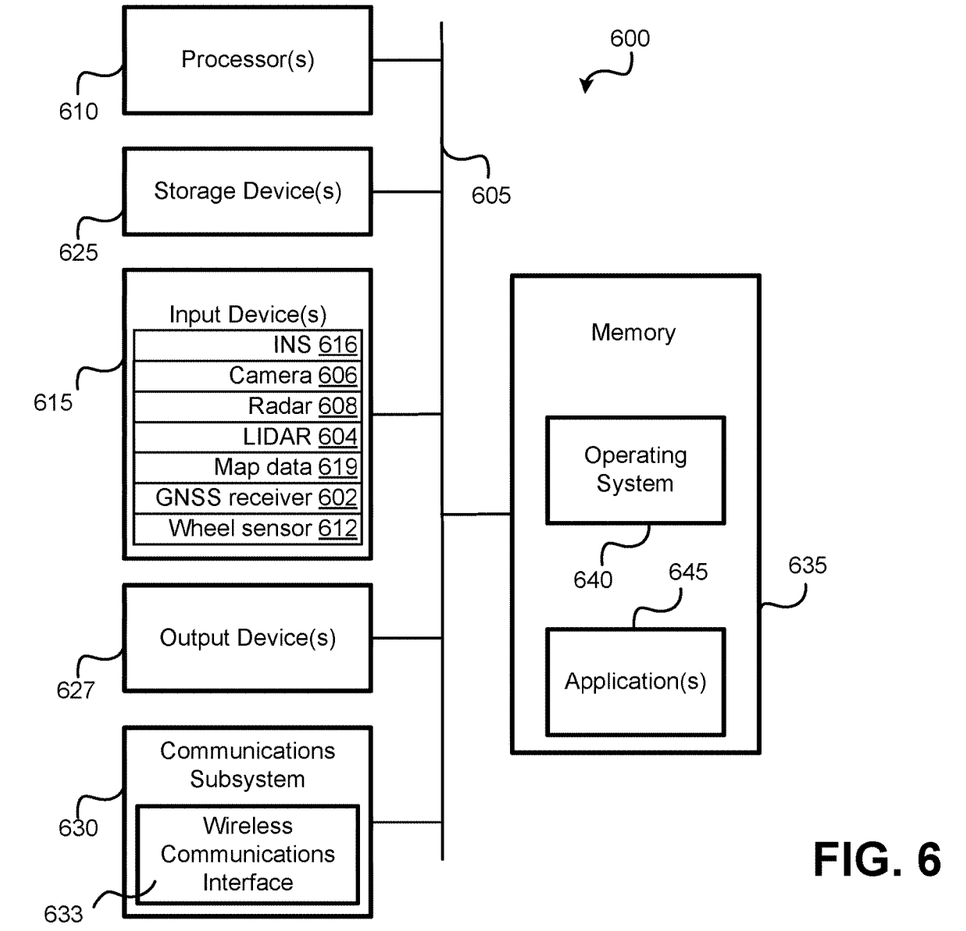
FIG. 6 illustrates an example computer system in which one or more embodiments may be implemented.

FIG. 2A shows a flow chart of a method 200 for vehicular navigation according to a general configuration that includes operations 210, 220, 230, 240, and 250. Means for performing one or more of the operations of method 200 may comprise, for example, software and/or hardware components of a computer system that may be integrated into vehicle or other mobile device. Example hardware and/or software components of such a computer system are illustrated in FIG. 6 and described hereafter.

At operation 210, the method 200 comprises determining a first attitude of the vehicle with respect to a reference frame at a first epoch. The first reference frame may comprise, for example, an ECEF, ENU, or NED coordinate frame, as illustrated in FIG. 1. Again, the rate or periodicity of epochs may vary, depending on desired functionality. In one example, the second epoch is one second (1 s) after the first epoch (e.g., in GNSS time), but in other implementations the period between the first and second epochs may be greater (e.g., 2 s, 2.5 s, 3 s, 4 s, or 5 s, etc.) or lesser (e.g., 100 ms, 50 ms, 20 ms, or 10 ms, etc.). The length of time between successive epochs may be determined, for example, by the frequency at which a Kalman filter is being operated for IMU bias estimation. In some cases, the length of time between successive epochs may be as little as 5 ms (e.g., for a Kalman filter frequency of 200 Hertz) and/or may vary over time.

Operation 210 may be implemented to determine the first attitude of the vehicle based on an attitude of an INS of the vehicle with respect to the reference frame at the first epoch. For example, operation 210 may be implemented to determine the first attitude of the vehicle with respect to a navigation frame, $R_{nav}^{veh}$ (shown by arrow 135 of FIG. 1), at a first epoch (t−1) according to the following matrix multiplication expression:

$$R_{nav}^{veh}(t-1) = R_{INS}^{veh} R_{nav}^{INS}(t-1),$$

wherein $R_{INS}^{veh}$ denotes the orientation of the body frame of the vehicle relative to the INS frame as noted above (e.g., noted by arrow 125 of FIG. 1), and $R_{nav}^{INS}(t-1)$ denotes the attitude of the INS with respect to the reference (navigation) frame at the first epoch, shown by arrow 140 of FIG. 1.

At operation 220 an attitude of the INS (e.g., an attitude with respect to the reference frame) at the second epoch that is subsequent to the first epoch may be determined based on measurement data from the INS of the vehicle. Operation 220 may be implemented to compute the attitude of the INS at the second epoch based on an attitude of the INS at the first epoch. For example, operation 220 may be implemented to determine the attitude of the INS at a second epoch (t) by propagating the attitude of the INS at the first epoch (t−1) according to the following matrix multiplication expression:

$$R_{INS}^{nav}(t) = R_{INS}^{nav}(t-1) \Delta R_{INS(t-1)}^{INS(t)},$$

where $\Delta R_{INS(t-1)}^{INS(t)}$ indicates a relative change in the attitude of the INS from the first epoch to the second epoch, as indicated by the measurement data, and $R_{INS}^{nav}(t-1)$ is the transpose of $R_{nav}^{INS}(t-1)$.

The measurement data from the INS may be based on data from at least one gyroscope of the INS. For example, the measurement data may indicate a rate of rotation about at least one axis of a gyroscope of the INS. In one example, $\Delta R_{INS(t-1)}^{INS(t)}$ is a rotation matrix obtained by converting a vector $\omega_{gyro}$ into DCM form, where $\omega_{gyro}$ denotes an angular velocity vector whose components represent rates of rotation about each of the three axes of the INS body frame from the first epoch to the second epoch.

As an alternative to the DCM form, operation 220 may be implemented to determine the attitude of the INS at the second epoch in quaternion form. For example, operation 220 may be implemented to determine the attitude of the INS at the second epoch (t) by propagating the attitude of the INS at the first epoch (t−1) according to the following quaternion multiplication expression:

$$q_{INS}^{nav}(t) = \Delta q_{INS(t-1)}^{INS(t)} q_{INS}^{nav}(t-1),$$

where $\Delta q_{INS(t-1)}^{INS(t)}$ is a state transition matrix that may be obtained from the vector $\omega_{gyro} = [\omega_x\ \omega_y\ \omega_z]^T$ and the sampling period $T_s$ (i.e., the time between the first and second epochs) as follows:

$$\Delta q_{INS(t-1)}^{INS(t)} = \begin{bmatrix} 1 & -\omega_x \frac{T_s}{2} & -\omega_y \frac{T_s}{2} & -\omega_z \frac{T_s}{2} \\ \omega_x \frac{T_s}{2} & 1 & -\omega_z \frac{T_s}{2} & \omega_y \frac{T_s}{2} \\ \omega_y \frac{T_s}{2} & \omega_z \frac{T_s}{2} & 1 & -\omega_x \frac{T_s}{2} \\ \omega_z \frac{T_s}{2} & -\omega_y \frac{T_s}{2} & \omega_x \frac{T_s}{2} & 1 \end{bmatrix}.$$

Propagating the INS attitude in quaternion form rather than DCM form may be advantageous in terms of, for example, reduced computational complexity, although it may still be desired to convert the propagated INS attitude to DCM form in order to compute the vehicle attitude. In a further example, operation 220 may be implemented to compute the attitude of the INS at the second epoch in a Rodrigues vector form. Conversions of an attitude representation among these various forms (e.g., DCM, quaternion, Euler angle, Rodrigues vector forms) are well known in the art.

Based on the determine attitude of the INS, operation 230 comprises determining a second attitude of the vehicle at the second epoch. For example, operation 230 may be implemented to compute the attitude of the INS at the second epoch (t) relative to the reference frame according to the following matrix multiplication expression:

$$R_{nav}^{veh}(t) = R_{INS}^{veh} R_{nav}^{INS}(t),$$

where $R_{nav}^{INS}(t)$ (denoting the attitude of the INS with respect to the reference (navigation) frame at the second epoch) is the transpose of $R_{INS}^{nav}(t)$.

At operation 240, the functionality comprises applying a constraint to the determined second attitude of the vehicle to produce an updated second attitude of the vehicle, wherein applying the constraint limits a change in one or more aspects of the determined attitude of the vehicle from the first epoch to the second epoch. For example, operation 240 may be implemented to apply a constraint on the rotation of the determined vehicle attitude about a corresponding axis of a body frame of the vehicle from the first epoch to the second epoch.

Figure 2B:
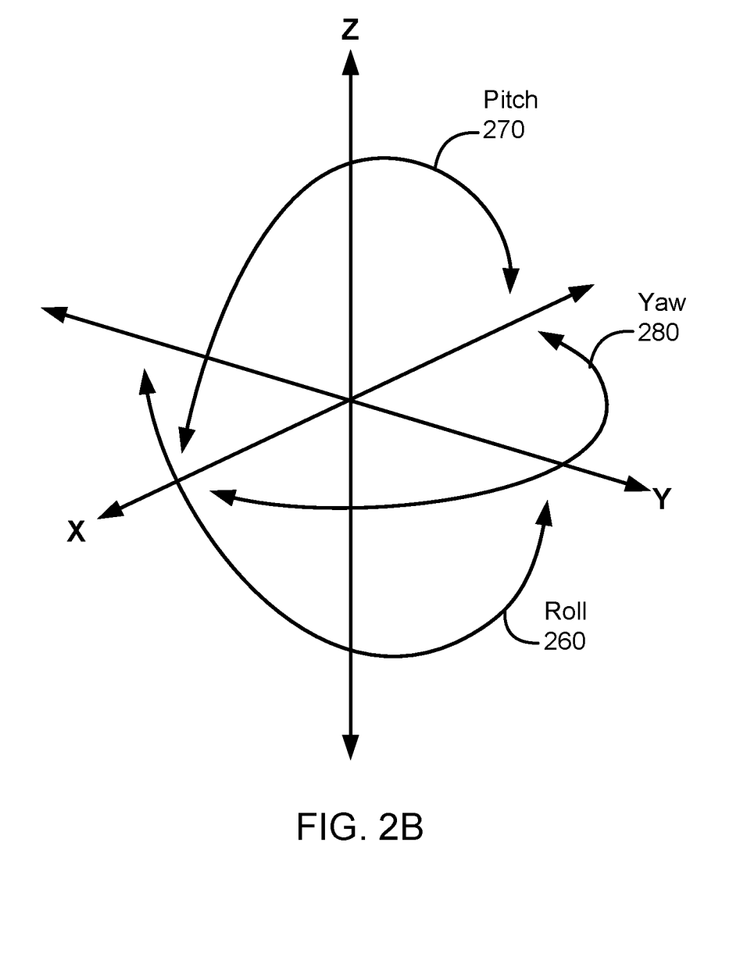
FIG. 2B shows a correspondence between X, Y, and Z axes of a coordinate frame and rotations about each of these axes.
Figure 4A:
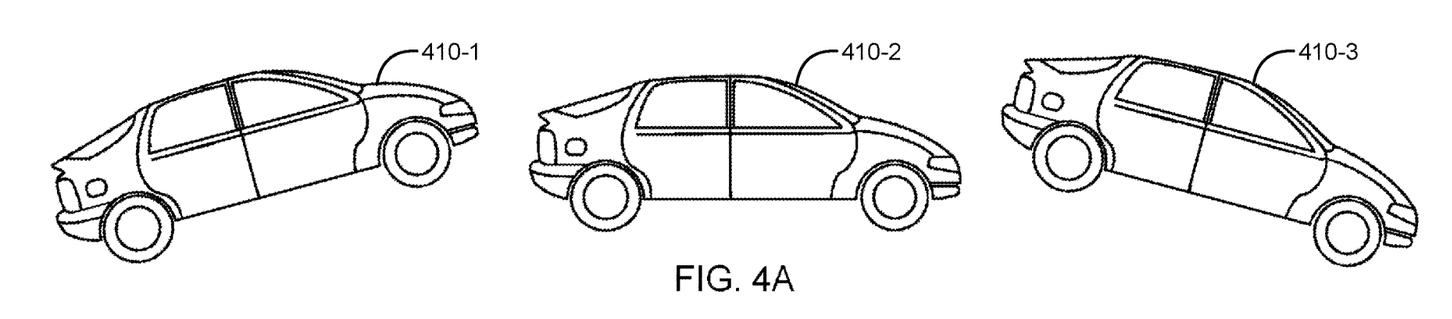
FIGS. 4A-4C illustrate a passenger car at different degrees of rotation about different axes.
Figure 4B:
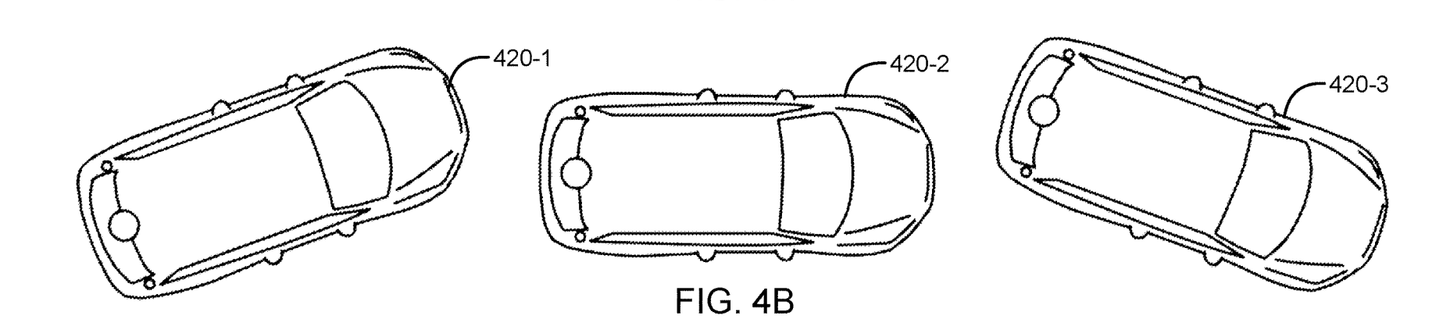
Figure 4C:
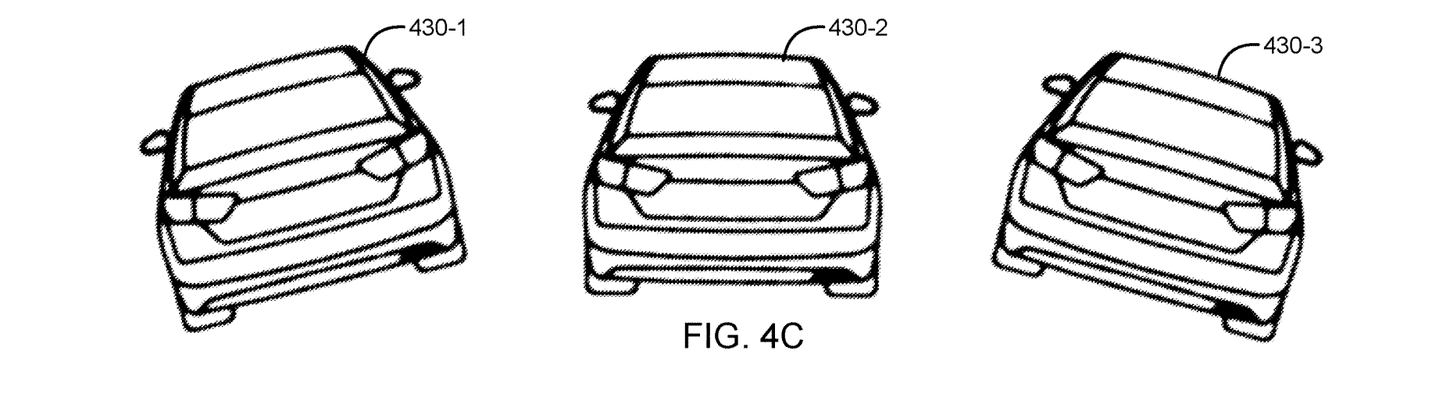

FIG. 2B shows a correspondence between X, Y, and Z axes of a coordinate frame and movements that are defined as rotations about each of these axes. As shown in FIG. 2B, roll 260 is defined as a rotation about the X axis, pitch 270 is defined as a rotation about the Y axis, and yaw 280 is defined as a rotation about the Z axis. FIG. 4A illustrates a passenger car in a side view at different rotations 410-1, 410-2, and 410-3 about the Y axis (i.e., different pitch angles), FIG. 4B illustrates the passenger car in top view at different rotations 420-1, 420-2, and 420-3 about the Z axis (i.e., different yaw angles), and FIG. 4C illustrates the passenger car in a rear view at different rotations 430-1, 430-2, and 430-3 about the X axis (i.e., different roll angles), where the X, Y, and Z axes of the vehicle body frame are as shown in FIG. 1.

Operation 240 may be implemented to apply the constraint by modifying one or more among the roll, pitch, and yaw angles of the determined vehicle attitude at the second epoch. For example, operation 240 may be implemented to constrain a change in one or more among the roll, pitch, and yaw angles of the determined vehicle attitude from the first epoch to the second epoch. Due to the nature of roadway design, it may be assumed that a vehicle which is not engaged in a turn will experience no change in roll angle. For a case in which the vehicle is not engaged in a turn from the first epoch to the second epoch (e.g., a case in which the change in yaw angle of the determined vehicle attitude from the first epoch to the second epoch is less than a threshold value), it may be desired to constrain the determined vehicle attitude by constraining a change in the roll angle from the first epoch to the second epoch. Such an implementation of operation 240 may include the following sequence of operations:

1) convert the determined vehicle attitude at the first epoch to roll, pitch, and yaw angles (also called "Euler angles"), and convert the determined vehicle attitude at the second epoch to roll, pitch, and yaw angles;
2) if a condition of the yaw angle of the attitude of the vehicle is satisfied (e.g., if the absolute change in yaw angle between the first and second epochs is less than (or does not exceed) a threshold value), then constrain the roll angle of the vehicle attitude at the second epoch (e.g., by setting the roll angle of the vehicle attitude at the second epoch to equal the roll angle of the vehicle attitude at the first epoch); and
3) if the roll angle of the vehicle attitude at the second epoch was constrained, then convert the vehicle attitude at the second epoch (i.e., wherein the roll angle has been constrained) back to, e.g., DCM form.

Additionally or alternatively, operation 240 may be implemented to apply a constraint to the determined second attitude of the vehicle that is based on other information. For example, it may be assumed that a change in the pitch angle of a vehicle will be equal to a change in the angle of inclination of the road surface. In one such case, operation 240 is implemented to use map data indicating angle of inclination of a road surface to constrain a change in the pitch angle of the vehicle from the first epoch to the second epoch (e.g., to equal the indicated angle of inclination).

Based on the updated second attitude of the vehicle, operation 250 comprises determining an updated attitude of the INS. For example, operation 250 may be implemented to determine the updated attitude of the INS at the second epoch (t) relative to the reference frame according to the following matrix multiplication expression:

$$R_{INS}^{nav}(t) = (R_{veh}^{INS} R_{nav}^{veh}(t))',$$

where $R_{veh}^{INS}$ is the transpose of $R_{INS}^{veh}$, and the prime denotes a transpose operation.

Method 200 may be iterated at each successive epoch during a period of dead reckoning. Although GNSS-INS fusion for IMU sensor bias correction is discussed herein as a background for dead reckoning, other sensor measurements may also be used for IMU sensor bias correction. In addition or in the alternative to GNSS measurements, for example, sensor fusion may be performed using measurements from one or more SONAR sensors, radar sensors, lidar sensors, and/or cameras (e.g., visible-light and/or infrared). In one example, measurements from one or more cameras are used with INS measurements to determine vehicle position and orientation by visual inertial odometry. When measurements from such other sensors are degraded or unavailable (e.g., no visual features to track on a snowy road), dead reckoning may be activated under principles of attitude constraint as described herein. For example, an instance of method 200 may be performed in response to such activation of dead reckoning.

Depending on desired functionality, the method 200 may comprise one or more additional functions. For example, according to some embodiments, the method 200 may further comprise providing the updated attitude of the INS. According to some embodiments, providing the updated attitude of the INS providing data indicative of the updated attitude to a software application, operating system, user interface, vehicle system, or remote device, or a combination thereof.

Figure 3A:
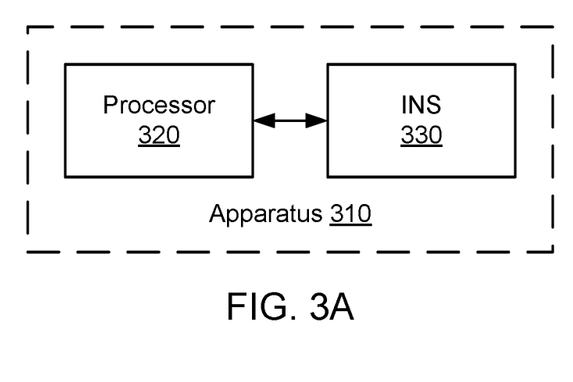
FIG. 3A shows a block diagram of an apparatus 310 for vehicular navigation according to a general configuration.

FIG. 3A shows a block diagram of an apparatus 310 for vehicular navigation according to a general configuration that includes a processor 320 coupled to an inertial navigation system (INS) 330. Inertial navigation system 330 may include a gyroscope that measures a rate of rotation about at least one axis. Such a gyroscope may be, for example, a micro-electro-mechanical systems (MEMS) gyroscope. A MEMS gyroscope may be, by way of example and not limitation, a vibrating mass gyroscope, a vibrating structure gyroscope, a tuning fork gyroscope, a vibrating ring gyroscope, a piezoelectric plate gyroscope, or any combination thereof. Inertial navigation system 330 may also include an accelerometer that measures a rate of acceleration along at least one axis. Such an accelerometer may be, for example, a MEMS accelerometer. A MEMS accelerometer may be constructed of, by way of example and not limitation, capacitive, variable capacitive, inductive, piezoelectric, or piezoresistive components, or any combination thereof. As described herein, a gyroscope and/or accelerometer of 330 may be part of an IMU of 330. Processor 320 (e.g., one or more processors) is configured to execute computer-executable instructions to compute a first attitude of a vehicle with respect to a reference frame at a first epoch; to compute, based on measurement data from INS 330, an attitude of INS 330 at a second epoch that is subsequent to the first epoch; to compute, based on the computed attitude of INS 330 and the computed first attitude of the vehicle, a second attitude of the vehicle at the second epoch; to apply a constraint to the computed second attitude of the vehicle to produce an updated second attitude of the vehicle; and to compute, based on the updated computed attitude of the vehicle, an updated attitude of INS 330. INS 330 may be implemented on one or more substrates, and processor 320 may be implemented at least in part on the same substrate as at least a portion of INS 330 and/or on another substrate. Computation (or "propagation") of the attitude of INS 330, for example, may be performed by a portion of processor 320 that is implemented on the same substrate as at least a portion of INS 330.

Figure 3B:
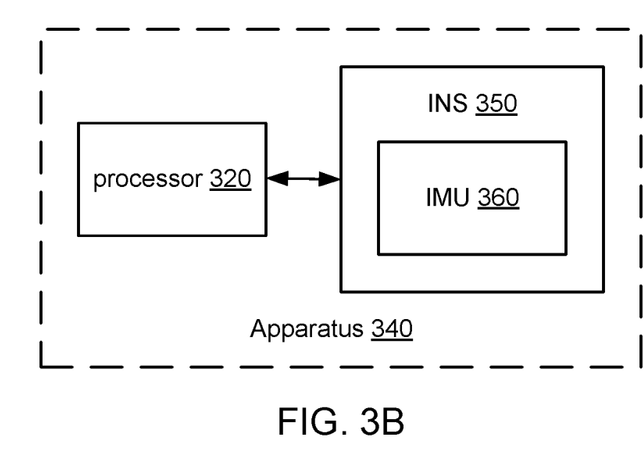
FIG. 3B shows a block diagram of an implementation of the apparatus of FIG. 3A that includes an implementation of an inertial navigation system.

FIG. 3B shows a block diagram of an implementation 340 of apparatus 310 that includes an implementation 350 of INS 330, where INS 350 includes an IMU 360 (e.g., an instance of an IMU as described herein). Inertial measurement unit 360 may be implemented to include a gyroscope that measures a rate of rotation about at least one axis (typically, a rate of rotation about each of three orthogonal axes of a body frame of the IMU). Such a gyroscope may be, for example, a micro-electro-mechanical systems (MEMS) gyroscope. A MEMS gyroscope may be, by way of example and not limitation, a vibrating mass gyroscope, a vibrating structure gyroscope, a tuning fork gyroscope, a vibrating ring gyroscope, a piezoelectric plate gyroscope, or any combination thereof. Inertial measurement unit 360 may also include an accelerometer that measures a rate of acceleration along at least one axis (typically, a rate of acceleration along each of three orthogonal axes of a body frame of the IMU). Such an accelerometer may be, for example, a MEMS accelerometer. A MEMS accelerometer may be constructed of, by way of example and not limitation, capacitive, variable capacitive, inductive, piezoelectric, or piezoresistive components, or any combination thereof.

Figure 5:
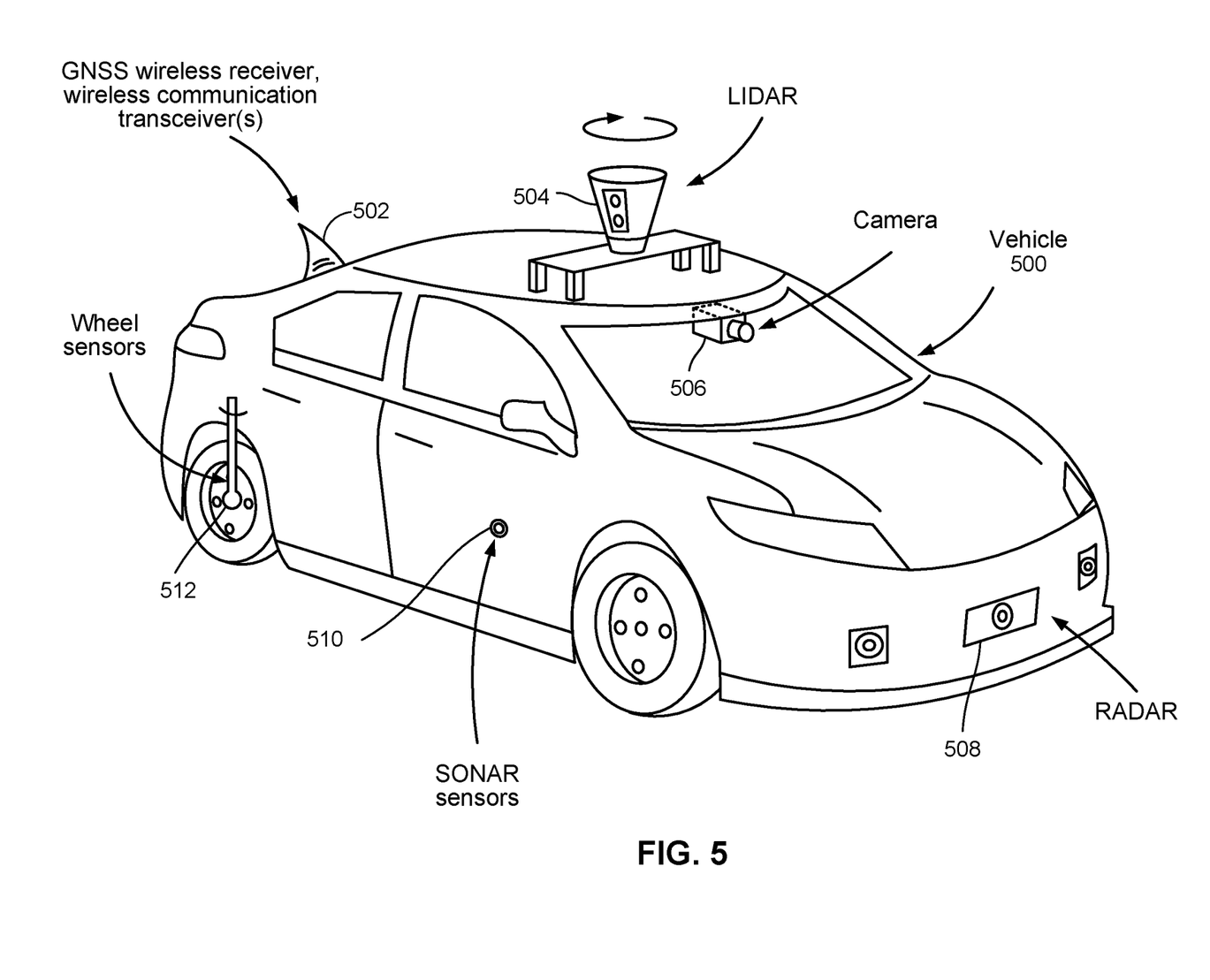
FIG. 5 is a perspective view of a vehicle that includes an implementation of the apparatus of FIG. 3A.

Apparatus 310 (for example, apparatus 340) may be installed in a vehicle that includes one or more other sensors that may support vehicular automation. FIG. 5 is a perspective view of such an vehicle 500 which includes an instance of INS 330 (not shown), which may be an instance of 350 as described herein. Vehicle 500 may include one or more cameras such as rear view mirror-mounted camera 506, front fender-mounted camera (not shown), side mirror-mounted camera (not shown) and a rear camera (not shown, but typically on the trunk, hatch or rear bumper). Vehicle 500 may also have lidar 504, for detecting objects and measuring distances to those objects; lidar 504 is often roof-mounted, however, if there are multiple lidar units 504, they may be oriented around the front, rear and sides of the vehicle. Vehicle 500 may have other various location-related systems such as a GNSS receiver (typically located in the shark fin unit on the rear of the roof, as indicated), various wireless communication interface (such as WAN, Wireless Local Area Network (WLAN), vehicle-to-everything (V2X); typically, but not necessarily, located in the shark fin on top of the vehicle), radar 508 (typically in the front bumper), and sonar 510 (typically located on both sides of the vehicle, if present). Various wheel sensors 512 (e.g., wheel tick sensors) and drive train sensors may also be present, such as tire pressure sensors, accelerometers, gyros, and wheel rotation detection and/or counters. In an embodiment, distance measurements and relative locations determined via various sensors such as lidar, radar, camera, GNSS, and sonar, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, it may be desired to modify an exact GNSS distance and vector between two GNSS receivers based upon, for example, the relative location of the various car surfaces to the GNSS receiver. It is realized that this list is not intended to be limiting and that FIG. 5 is intended to provide exemplary locations of various sensors in an embodiment of a vehicle comprising an instance of apparatus 310 (e.g., an instance of apparatus 340).

FIG. 6 illustrates an example computer system 600 that may be utilized with and/or incorporate one or more electronic components of apparatus 310 and/or 340 (e.g., INS 330 (or 350), processor 320). In certain embodiments, computer system 600 is deployed in a vehicle (e.g., vehicle 500). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

As depicted in FIG. 6, the computer system 600 may comprise hardware elements that can be communicatively coupled via a bus 605 (or other wired and/or wireless communication infrastructure, as appropriate). The hardware elements may include one or more processors 610, which can include without limitation one or more general-purpose processors, one or more special-purpose processors such as digital signal processor (DSP), graphics acceleration processors, application specific integrated circuits (ASICs), and/or the like. The processor(s) 610 may perform vehicular navigation processing including, for example, estimating position, velocity, and/or attitude. Processor 320 may be implemented in whole or in part within processor(s) 610.

The computer system 600 may include one or more input devices 615, which can include without limitation a touch screen, a keyboard, a touch pad, a camera, a microphone, and/or other user input devices, map data (e.g., map data 619), and/or the like; and one or more output devices 627, which can include without limitation a display device, speakers, and/or the like.

The computer system 600 may further include a wireless communication interface 630, which may include without limitation, a network card, an infrared communication device, a wireless communication interface 633, and/or a chipset (such as a Bluetooth® device, an Institute of Electrical and Electronics Engineers (IEEE) 802.11 device, or cellular communication facilities), and/or the like, which may enable the computer system 600 to communicate with external computer systems or electronic devices. The communication can be carried out via one or more wireless communication antenna(s) (not shown) that send and/or receive wireless signals.

The input devices 615 may further include one or more sensors. Such sensors may comprise, without limitation, one or more instances of: an INS 616 (e.g., INS 330 and/or INS 350 (including, e.g., an accelerometer, a gyroscope, and/or an IMU (e.g., IMU 360))), a radar 608 (e.g., radar 508), a camera 606 (e.g., camera 506), a magnetometer, a lidar 604 (e.g., lidar unit 504), an altimeter, a microphone, an ultrasonic sensor, a light sensor, a wheel sensor 612 (e.g., wheel sensor 512), and the like, some of which may be used to complement and/or facilitate the navigation-related processing described herein.

The computer system 600 may further include a GNSS receiver 602 (e.g., included as part of receiver 502 of FIG. 5) operable to receive signals from one or more GNSS satellites using an antenna. The signals can be utilized to complement and/or incorporate the techniques described herein (e.g., to correct INS states, such as position states, velocity states, and/or attitude states). In certain embodiments, the GNSS signals may be used to determine a geographical location of the computer system 600, e.g., for use in vehicle navigation.

The computer system 600 may further include and/or be in communication with a memory 635 (e.g., short-term working memory) and one or more storage devices 625 (e.g., long-term data storage). The memory 635 and/or one or more storage devices 625 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. In certain embodiments, memory 635 may store a codebook comprising parameters for transmit waveforms.

The memory 635 may comprise a non-transitory computer-readable medium storing instructions executable by one or more processors of computer system 600 (e.g., processors 610). Such instructions may be stored as program code, e.g., an operating system 640, device drivers, executable libraries, or other application programs 645. The instructions stored in memory 635 may be configured to cause the processor(s) to perform the radar-related processing described herein. Merely by way of example, one or more procedures described with respect to the method 200 of FIG. 2A discussed above may be implemented as code and/or instructions executable by processor(s) 610. In an aspect, then, such code and/or instructions can be used to configure and/or adapt a general purpose computer (or other computing device) to perform one or more operations in accordance with the techniques described herein.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices such as network input/output devices may be employed.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The various elements of an implementation of an apparatus or system as disclosed herein may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, intellectual property (IP) cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform operations or execute other sets of instructions that are not directly related to a procedure of an implementation of method 200 (or another method as disclosed with reference to operation of an apparatus or system described herein), such as a operation relating to another operation of a device or system in which the processor is embedded. It is also possible for part of a method as disclosed herein to be performed under the control of one or more other processors.

Each of the operations of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various operations of the method. One or more (possibly all) of the operations may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The operations of an implementation of a method as disclosed herein may also be performed by more than one such array or machine.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, electrically Erasable Programmable Read-Only Memory (EEPROM), and/or flash RAM), or ferroelectric, magnetoresistive, ovonic, polymeric, or phase-change memory; Compact Disc-Read Only Memory (CD-ROM) or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

In one example, a non-transitory computer-readable storage medium comprises code which, when executed by at least one processor, causes the at least one processor to perform a method of vehicular navigation as described herein.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

In view of this description embodiments may include different combinations of features. Implementation examples are described in the following numbered clauses:

Clause 1. A method of vehicular navigation, the method comprising: determining a first attitude of a vehicle with respect to a reference frame at a first epoch; based on measurement data from an inertial navigation system (INS) of the vehicle, determining an attitude of the INS at a second epoch that is subsequent to the first epoch; based on the determined attitude of the INS, determining a second attitude of the vehicle at the second epoch; applying a constraint to the determined second attitude of the vehicle to produce an updated second attitude of the vehicle, wherein applying the constraint limits a change in one or more aspects of the determined second attitude of the vehicle from the first epoch to the second epoch; and based on the updated second attitude of the vehicle, determining an updated attitude of the INS.

Clause 2. The method according to clause 1, wherein determining the first attitude of the vehicle is based, at least in part, on: an attitude of the INS with respect to the reference frame at the first epoch, or an orientation of a body frame of the INS relative to a body frame of the vehicle, or a combination thereof.

Clause 3. The method according to any of clauses 1-2 wherein the measurement data indicates a rate of rotation about at least one axis of a gyroscope of the INS.

Clause 4. The method according to any of clauses 1-3 wherein the attitude of the INS at the second epoch is an attitude with respect to the reference frame.

Clause 5. The method according to any of clauses 1-4 wherein the attitude of the INS at the second epoch is based on an attitude of the INS at the first epoch.

Clause 6. The method according to any of clauses 1-5 wherein applying the constraint comprises detecting a condition of a yaw angle of the attitude of the vehicle.

Clause 7. The method according to any of clauses 1-6 wherein the applying a constraint comprises modifying a roll angle of the determined second attitude of the vehicle.

Clause 8. The method according to any of clauses 1-7 wherein the method is performed during a period of dead reckoning for the vehicle.

Clause 9. The method according to any of clauses 1-8 further comprising providing the updated attitude of the INS.

Clause 10. The method according to clause 9 wherein providing the updated attitude of the INS comprises providing data indicative of the updated attitude to a software application, operating system, user interface, vehicle system, or remote device, or a combination thereof.

Clause 11. A device for vehicular navigation, the device comprising: an inertial navigation system (INS); a memory; and one or more processors communicatively coupled with the INS and the memory, wherein the one or more processors are configured to: determine a first attitude of a vehicle with respect to a reference frame at a first epoch; based on measurement data from an inertial navigation system (INS) of the vehicle, determine an attitude of the INS at a second epoch that is subsequent to the first epoch; based on the determined attitude of the INS, determine a second attitude of the vehicle at the second epoch; apply a constraint to the determined second attitude of the vehicle to produce an updated second attitude of the vehicle, wherein applying the constraint limits a change in one or more aspects of the determined second attitude of the vehicle from the first epoch to the second epoch; and based on the updated second attitude of the vehicle, determine an updated attitude of the INS.

Clause 12. The device of clause 11, wherein the one or more processors are configured determine first attitude of the vehicle based, at least in part, on: an attitude of the INS with respect to the reference frame at the first epoch, or an orientation of a body frame of the INS relative to a body frame of the vehicle, or a combination thereof.

Clause 13. The device of any of clauses 11-12 wherein the INS is configured to include, in the measurement data, a rate of rotation about at least one axis of a gyroscope of the INS.

Clause 14. The device of any of clauses 11-13 wherein, to determine the attitude of the INS at the second epoch, the one or more processors are configured to determine an attitude with respect to the reference frame.

Clause 15. The device of any of clauses 11-14 wherein the one or more processors are configured to determine the attitude of the INS at the second epoch based on an attitude of the INS at the first epoch.

Clause 16. The device of any of clauses 11-15 wherein, to apply the constraint, the one or more processors are configured to detect a condition of a yaw angle of the attitude of the vehicle.

Clause 17. The device of any of clauses 11-16 wherein, to apply the constraint, the one or more processors are configured to modify a roll angle of the determined second attitude of the vehicle.

Clause 18. The device of any of clauses 11-17 wherein the one or more processors are configured to determine the updated attitude of the INS during a period of dead reckoning for the vehicle.

Clause 19. The device of any of clauses 11-18 wherein the one or more processors are further configured to provide the updated attitude of the INS.

Clause 20. The device of clause 19 wherein, to provide the updated attitude of the INS, the one or more processors are configured to provide data indicative of the updated attitude to a software application, operating system, user interface, vehicle system, or remote device, or a combination thereof.

Clause 21. An apparatus for vehicular navigation, the apparatus comprising: means for determining a first attitude of a vehicle with respect to a reference frame at a first epoch; means for determining an attitude of an inertial navigation system (INS) of the vehicle at a second epoch that is subsequent to the first epoch, based on measurement data from the INS; means for determining a second attitude of the vehicle at the second epoch based on the determined attitude of the INS; means for applying a constraint to the determined second attitude of the vehicle to produce an updated second attitude of the vehicle, wherein applying the constraint limits a change in one or more aspects of the determined second attitude of the vehicle from the first epoch to the second epoch; and means for determining an updated attitude of the INS based on the updated second attitude of the vehicle.

Clause 22. The apparatus of clause 21, wherein means for determining the first attitude of the vehicle comprises means for basing the determining of the first attitude of the vehicle, at least in part, on: an attitude of the INS with respect to the reference frame at the first epoch, or an orientation of a body frame of the INS relative to a body frame of the vehicle, or a combination thereof.

Clause 23. The apparatus of any of clauses 21-22 wherein the means for determining the attitude of the INS at the second epoch comprises means for determining an attitude with respect to the reference frame.

Clause 24. The apparatus of any of clauses 21-23 wherein the means for determining the attitude of the INS at the second epoch comprises means for basing the determining of the attitude of the INS at the second epoch on an attitude of the INS at the first epoch.

Clause 25. The apparatus of any of clauses 21-24 wherein the means for applying the constraint comprises means for detecting a condition of a yaw angle of the attitude of the vehicle.

Clause 26. The apparatus of any of clauses 21-25 wherein the means for applying the constraint comprises means for modifying a roll angle of the determined second attitude of the vehicle.

Clause 27. The apparatus of any of clauses 21-26 further comprising means for providing the updated attitude of the INS.

Clause 28. The apparatus of clause 27 wherein the means for providing the updated attitude of the INS comprises means for providing data indicative of the updated attitude to a software application, operating system, user interface, vehicle system, or remote device, or a combination thereof.

Clause 29. A non-transitory computer-readable medium storing instructions for vehicular navigation, the instructions comprising code for: determining a first attitude of a vehicle with respect to a reference frame at a first epoch; determining an attitude of an inertial navigation system (INS) of the vehicle at a second epoch that is subsequent to the first epoch based on measurement data from the INS; determining a second attitude of the vehicle at the second epoch based on the determined attitude of the INS; applying a constraint to the determined second attitude of the vehicle to produce an updated second attitude of the vehicle, wherein applying the constraint limits a change in one or more aspects of the determined second attitude of the vehicle from the first epoch to the second epoch; and determining an updated attitude of the INS based on the updated second attitude of the vehicle.

Clause 30. The non-transitory computer-readable medium of clause 29, wherein the code for determining the first attitude of the vehicle comprises code for determining the first attitude of the vehicle based, at least in part, on: an attitude of the INS with respect to the reference frame at the first epoch, or an orientation of a body frame of the INS relative to a body frame of the vehicle, or a combination thereof.

What is claimed is:

1. A method of vehicular navigation performed by a vehicle system, the method comprising:
    determining a first attitude of a vehicle with respect to a reference frame at a first epoch, the determined first attitude including a determined first roll angle;
    based on measurement data from an inertial navigation system (INS) of the vehicle, determining an attitude of the INS at a second epoch that is subsequent to the first epoch;
    based on the determined attitude of the INS at the second epoch, determining a second attitude of the vehicle at the second epoch;
    updating the determined second attitude of the vehicle, based on a determination that an absolute change in a yaw angle of the vehicle between the first epoch and the second epoch is less than a predetermined threshold by setting a roll angle of the determined second attitude of the vehicle to equal the determined first roll angle;
    determining, based on the updated second attitude of the vehicle, an updated attitude of the INS; and
    navigating the vehicle based on the updated attitude of the INS.

2. The method according to claim 1, wherein determining the first attitude of the vehicle is based, at least in part, on:
    an attitude of the INS at the first epoch with respect to the reference frame, or
    an orientation of a body frame of the INS at the first epoch relative to a body frame of the vehicle, or
    a combination thereof.

3. The method according to claim 1, wherein the measurement data indicates a rate of rotation about at least one axis of a gyroscope of the INS.

4. The method according to claim 1, wherein the attitude of the INS at the second epoch is an attitude with respect to the reference frame.

5. The method according to claim 1, wherein the attitude of the INS at the second epoch is based on an attitude of the INS at the first epoch.

6. The method according to claim 1, wherein the method is performed during a period of dead reckoning for the vehicle.

7. The method according to claim 1, further comprising providing the updated attitude of the INS.

8. A device for vehicular navigation, the device comprising:
    an inertial navigation system (INS);
    a memory; and
    one or more processors communicatively coupled with the INS and the memory, wherein the one or more processors are configured to:
        determine a first attitude of a vehicle with respect to a reference frame at a first epoch, the determined first attitude including a determined first roll angle;
        based on measurement data from the INS, determine an attitude of the INS at a second epoch that is subsequent to the first epoch;
        based on the determined attitude of the INS at the second epoch, determine a second attitude of the vehicle at the second epoch;
        update the determined second attitude of the vehicle based on a determination that an absolute change in a yaw angle of the vehicle between the first epoch and the second epoch is less than a predetermined threshold, by setting a roll angle of the determined second attitude of the vehicle to equal the determined first roll angle;
        determine, based on the updated second attitude of the vehicle, an updated attitude of the INS; and
        navigate the vehicle based on the updated attitude of the INS.

9. The device of claim 8, wherein the one or more processors are configured to determine the first attitude of the vehicle based, at least in part, on:
    an attitude of the INS at the first epoch with respect to the reference frame, or
    an orientation of a body frame of the INS at the first epoch relative to a body frame of the vehicle, or
    a combination thereof.

10. The device of claim 8, wherein the INS is configured to include, in the measurement data, a rate of rotation about at least one axis of a gyroscope of the INS.

11. The device of claim 8, wherein, to determine the attitude of the INS at the second epoch, the one or more processors are configured to determine an attitude with respect to the reference frame.

12. The device of claim 8, wherein the one or more processors are configured to determine the attitude of the INS at the second epoch based on an attitude of the INS at the first epoch.

13. The device of claim 8, wherein the one or more processors are configured to determine the updated attitude of the INS during a period of dead reckoning for the vehicle.

14. The device of claim 8, wherein the one or more processors are further configured to provide the updated attitude of the INS.

15. An apparatus for vehicular navigation, the apparatus comprising:
    means for determining a first attitude of a vehicle with respect to a reference frame at a first epoch, the determined first attitude including a determined first roll angle;
    means for determining an attitude of an inertial navigation system (INS) of the vehicle at a second epoch that is subsequent to the first epoch, based on measurement data from the INS;
    means for determining a second attitude of the vehicle at the second epoch based on the determined attitude of the INS at the second epoch;

means for updating the determined second attitude of the vehicle, based on a determination that an absolute change in a yaw angle of the vehicle between the first epoch and the second epoch is less than a predetermined threshold, by setting a roll angle of the determined second attitude of the vehicle to equal the determined first roll angle;

means for determining an updated attitude of the INS based on the updated second attitude of the vehicle; and means for navigating the vehicle based on the updated attitude of the INS.

16. The apparatus of claim 15, wherein means for determining the first attitude of the vehicle comprises means for basing the determining of the first attitude of the vehicle, at least in part, on:

an attitude of the INS at the first epoch with respect to the reference frame, or an orientation of a body frame of the INS at the first epoch relative to a body frame of the vehicle, or a combination thereof.

17. The apparatus of claim 15, wherein the means for determining the attitude of the INS at the second epoch comprises means for determining an attitude with respect to the reference frame.

18. The apparatus of claim 15, wherein the means for determining the attitude of the INS at the second epoch comprises means for basing the determining of the attitude of the INS at the second epoch on an attitude of the INS at the first epoch.

19. The apparatus of claim 15, further comprising means for providing the updated attitude of the INS.

20. A non-transitory computer-readable medium storing instructions for vehicular navigation, the instructions comprising code for:

determining a first attitude of a vehicle with respect to a reference frame at a first epoch, the determined first attitude including a determined first roll angle;

determining an attitude of an inertial navigation system (INS) of the vehicle at a second epoch that is subsequent to the first epoch based on measurement data from the INS;

determining a second attitude of the vehicle at the second epoch based on the determined attitude of the INS at the second epoch;

updating the determined second attitude of the vehicle based on a determination that an absolute change in a yaw angle of the vehicle between the first epoch and the second epoch is less than a predetermined threshold by setting a roll angle of the determined second attitude of the vehicle to equal the determined first roll angle; and determining an updated attitude of the INS based on the updated second attitude of the vehicle; and navigating the vehicle based on the updated attitude of the INS.

21. The non-transitory computer-readable medium of claim 20, wherein the code for determining the first attitude of the vehicle comprises code for determining the first attitude of the vehicle based, at least in part, on:

an attitude of the INS at the first epoch with respect to the reference frame, or an orientation of a body frame of the INS at the first epoch relative to a body frame of the vehicle, or a combination thereof.

\* \* \* \* \*